(12) United States Patent
Honig et al.

(10) Patent No.: US 6,487,171 B1
(45) Date of Patent: Nov. 26, 2002

(54) CROSSBAR SWITCHING MATRIX WITH BROADCAST BUFFERING

(75) Inventors: Yoav Honig, Kfar Saba (IL); Meir Ohana, Hadera (IL); Amir Lahat, Kibbutz Givat-Brenner (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/315,214

(22) Filed: May 19, 1999

(51) Int. Cl.⁷ .......................... G06F 13/36; H04L 12/56
(52) U.S. Cl. ................. 370/235; 370/360; 370/395.42; 710/40; 710/309
(58) Field of Search ................. 370/351, 389, 370/395.1, 395.5, 395.4, 395.42, 395.51, 229, 235, 395.71, 236.1, 236.2, 360, 362, 401, 402, 437, 465, 902, 905; 710/305, 316, 317, 309, 33, 38, 40

(56) References Cited

U.S. PATENT DOCUMENTS

| | | | |
|---|---|---|---|
| 4,823,338 A | 4/1989 | Chan et al. ................. 370/85 |
| 4,975,906 A | 12/1990 | Takiyasu et al. ......... 370/85.13 |
| 5,214,646 A | 5/1993 | Yacoby ................... 370/85.14 |
| 5,276,681 A * | 1/1994 | Tobagi et al. | |
| 5,280,476 A | 1/1994 | Kojima et al. ............. 370/60.1 |
| 5,280,481 A | 1/1994 | Chang et al. ............. 370/85.13 |
| 5,315,582 A | 5/1994 | Morizono et al. ............ 370/16 |
| 5,321,693 A | 6/1994 | Perlman ................... 370/85.13 |
| 5,321,694 A | 6/1994 | Chang et al. ............. 370/85.13 |
| 5,329,527 A | 7/1994 | Ujihashi et al. .......... 370/85.13 |
| 5,329,619 A | 7/1994 | Page et al. ................... 395/200 |
| 5,345,558 A | 9/1994 | Opher et al. ................ 395/200 |
| 5,390,184 A | 2/1995 | Morris ....................... 370/94.2 |
| 5,394,402 A | 2/1995 | Ross ......................... 370/94.1 |
| 5,408,469 A | 4/1995 | Opher et al. ............... 370/60.1 |
| 5,410,343 A | 4/1995 | Coddington et al. ........... 348/7 |

(List continued on next page.)

FOREIGN PATENT DOCUMENTS

| | | | |
|---|---|---|---|
| EP | 0 785 697 A2 | 7/1997 | ........... H04Q/11/04 |
| WO | WO97/04386 | 6/1997 | ........... G06F/9/455 |
| WO | WO98/02821 | 1/1998 | ........... G06F/13/00 |

OTHER PUBLICATIONS

Perlman, R., "Interconnections: Bridges and Routers", Addison–Wesley Publishing, Section 9.2.4, Chapter 9, pp. 205–264 (1992).

(List continued on next page.)

Primary Examiner—William A. Luther
(74) Attorney, Agent, or Firm—Howard Zaretsky

(57) ABSTRACT

A novel crossbar switching matrix that improves the transmission of variable length broadcast packets by greatly reducing transmission latency time. Unicast traffic is halted in the middle of packet transmission operations and the broadcast packet is transmitted. Once the broadcast packet has finished transmission, unicast packet transmission resumes without any loss of data. A unicast buffer is used to store the unicast packet while the broadcast packet is being transmitted. A broadcast buffer is used to buffer the broadcast packet as it egresses from the switch matrix. In this fashion, the broadcast information is given high priority and passes quickly through the switch without the large delays associated with the prior art switch matrixes. The crossbar switch matrix of the present invention is applicable to any switching matrix adapted to switch variable length data units.

4 Claims, 8 Drawing Sheets

U.S. PATENT DOCUMENTS

| | | | |
|---|---|---|---|
| 5,444,702 A | 8/1995 | Burnett et al. | 370/60.1 |
| 5,481,680 A | 1/1996 | Larson et al. | 395/292 |
| 5,483,536 A | 1/1996 | Gunji et al. | 370/85.14 |
| 5,519,704 A | 5/1996 | Farinacci et al. | 370/85.13 |
| 5,548,646 A | 8/1996 | Aziz et al. | 380/23 |
| 5,548,723 A | 8/1996 | Pettus | 395/200.01 |
| 5,550,816 A | 8/1996 | Hardwick et al. | 370/60 |
| 5,550,818 A | 8/1996 | Brackett et al. | 370/60 |
| 5,566,014 A | 10/1996 | Glance | 359/124 |
| 5,583,865 A | 12/1996 | Esaki et al. | 370/397 |
| 5,600,644 A | 2/1997 | Chang et al. | 370/404 |
| 5,633,869 A | 5/1997 | Burnett et al. | 370/396 |
| 5,636,210 A * | 6/1997 | Agrawal | |
| 5,659,542 A | 8/1997 | Bell et al. | 370/496 |
| 5,666,487 A | 9/1997 | Goodman et al. | 395/200.76 |
| 5,726,985 A | 3/1998 | Daniel et al. | 370/382 |
| 5,784,374 A | 7/1998 | Runaldue | 370/414 |
| 5,784,683 A | 7/1998 | Sistanizadeh et al. | 455/5.1 |
| 5,790,548 A | 8/1998 | Sistanizadeh et al. | 370/401 |
| 6,032,205 A * | 2/2000 | Ogimoto et al. | |
| 6,188,690 B1 * | 2/2001 | Holden et al. | |
| 6,396,809 B1 * | 5/2002 | Holden et al. | |

OTHER PUBLICATIONS

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–87.

Williams, K. A., "A Distributed ATM Network Based on an Optical Passive Star", printed from website http://williams.cs.ncat.edu/ATMStar.htm, 2 pages, (1998).

"All–optical ATM–Switch based on self Electro–optic Effect Devices (Seed's)", printed from website http://www.stw.nl/projecten/T/tel3997.html, 2 pages, Feb. 2, 1997.

Tzeng, Hong–Yi et al., "On Max–Min Fair Congestion Control for Multicast ABR Service in ATM", *IEEE Communications*, vol. 15, No. 3, Apr. 1997, pp. 545–555.

Simpson, W., "IP in IP Tunneling", Request for Comments #153, Oct. 1995, 9 pages.

Swallow, G., "Frame Relay PVC Multicast Service and Protocol Description", FRF.7, Frame Relay Forum Implementation Agreement, Oct. 21, 1994, printed from internet site www.frforum.com, 17 pages.

Cisco—"Packet Services", printed from website http://www.cisco.com/warp/public/732/Tech/pksrv_tc.html, 32 pages, Dec. 1995.

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

"All About . . . Multicast Wide Area Network Services", printed from website http://www.starburstcom.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell Net Ware Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B–22.

Kwok, T., "ATM: The New Paradigm for Internet, Intranet and Residential Broadband Services and Applications", Prentice–Hall, pp. 214–215 and 256–258 (1998).

* cited by examiner

CROSSBAR SWITCHING MATRIX WITH BROADCAST BUFFERING

FIELD OF THE INVENTION

The present invention relates generally to data communication switching systems and more particularly relates to a cross bar switching matrix having improved broadcast performance due to the utilization of broadcast buffering.

BACKGROUND OF THE INVENTION

Increasing reliance is being placed on data communication networks to carry increasing amounts of data. In a data communications network, data is transmitted end to end in groups of bits called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from a source to a destination. Alternatively, the application may wish to send the data unit to multiple destinations.

Currently, many switching systems utilize switching fabrics or matrixes that are designed to switch variable length packets of data. The variable length of packets in these switching systems, however, offer larger and less predictable switching delays as packet switching is more complex than fixed length packet switching.

Unicast, Broadcast and Multicast

The transmission of data to a single destination is termed unicast data while the transmission of data to all destinations is termed broadcast data. The transmission of data to a select number of destinations larger than one is termed multicast data. In an example switching system, each call connection within the switch has associated with it a routing tag or equivalent that functions to identify the destination for the packet.

For unicast connections, the routing information identifies a single destination for the packet. For broadcast connections, the routing information identifies the packet as a broadcast packet that is to be distributed to all output ports. For multicast connections, the routing information identifies several destinations for the packet.

A majority of data communication networks today attempt to not lose even a single bit of information in transmitting data from one point to another. In order to achieve such high levels of performance and low error rates, the network equipment is constructed with relatively large sized queues. The large queues are needed in order to handle the accumulation of packets without overflowing the queues. An overflow of a queue will result in packets being lost, i.e., dropped. Packets may be dropped at the source queue if the destination is full and thus cannot receive additional packets. In this case, the source queue fills up and at some point will overflow, with consequent packet loss.

A problem arises, however, with the transmission of broadcast packets through the switching matrix. In prior art switching systems, the switch must wait until the matrix tracks are cleared before a broadcast packet can be transmitted through the switch. All the output ports of the switch matrix must be free before the broadcast packet can be transmitted. This results in very large delays, which greatly reduces the efficiency and throughput of the switch matrix. The following example illustrates this problem.

A block diagram illustrating an example prior art crossbar switch matrix capable of handling unicast, broadcast and multicast traffic is shown in FIG. 1. The switching system, generally referenced 10, comprises a plurality of input/output (I/O) interface (I/F) cards 12 having a plurality of PHY interfaces, labeled 1 through M, and a plurality of outputs, labeled 1 through N. The system 10 further comprises an N×N crossbar switch matrix 14 having N input ports and N output ports. The N outputs of the I/F cards 12 are coupled to the N input ports of the switch matrix 14. The N output ports of the switch matrix 14 are input back to the I/F cards 12. A controller 16 functions to control the configuration of the switch matrix 14 at any particular point in time via one or more control lines 18 labeled CNTRL.

The crossbar switch is required to switch the entire set of input ports to the output ports in accordance with configuration information from the controller 16. The controller 16 is responsible for providing the appropriate configuration information to the crossbar switch matrix 14 at the correct time. The crossbar switch 14 performs the switching operation in accordance with the switching information provided by the controller. In the event of a broadcast packet to be transmitted from any of the I/F cards, the configuration controller 16 provides the appropriate switching commands which cause the broadcast packet to be transmitted to all the output ports. This is achieved by the issuance of the suitable configuration commands to each I/F card. All I/F cards (except the one transmitting the broadcast packet) and all the input ports will be in the idle state for a broadcast transmission to occur.

A block diagram illustrating the I/O interface (I/F) card of the prior art switch in more detail is shown in FIG. 2. The I/O card 20 comprises a PHY interface 24 to/from a physical connection 22. The I/O card also comprises a controller/packet processor 26, memory 27, output queues 28, input queue 30, host interface 25 and backplane interface 29.

The I/O card comprises N output queues 28, labeled $Q_1$ through $Q_N$, one queue corresponding to each output port of the switch matrix. An additional broadcast queue, labeled $Q_{BC}$, is also included for buffering packets to be broadcast to all output ports. Note that the queues may optionally be implemented using the memory 27. The queues interface to the switch matrix via a backplane interface 29.

The PHY interface 24 is coupled to a controller/packet processor 26 that functions to receive packets and route them to the appropriate output queue. Note that the PHY interface 24 may be adapted to handle electrical or optical signals, e.g., OC-3, OC-12, SONET, 1000BaseT, etc.

In operation, the format of the received signal is converted to packets and input to the packet processor 26. The packet processor 26 functions to process the data destined to the ingress of the switching matrix and to process the data output from the egress of the switching matrix. The packet processor, in accordance with the connection information, determines a destination output port for data received over the PHY I/O channel. For unicast transmission, the packet processor places the packet in one of N queues 28 corresponding to one of N output ports. For broadcast connections, the packet is placed in the broadcast queue $Q_{BC}$ for broadcast to all output ports simultaneously.

When packets are output of the switch matrix, they return to the I/F card corresponding to the output port. A backplane interface 29 interfaces the input and output queues to the switch matrix. Packets destined to an output queue on a particular I/F card, are input to the output queue $Q_o$ 30 via the backplane interface 29. The packet is then input to the packet processor 26 and output to the PHY via the PHY interface 24.

Note that a unicast queue is a physical queue that accumulates packets designated to be transmitted to a single destination queue and is associated with a point to point connection. A broadcast queue is a physical queue that accumulates packets designated to be transmitted to all destination queues A disadvantage of this prior art switching architecture is that the transmission of broadcast packets occurs only when all the input ports are in the idle state, i.e., they are not in the middle of transmitting a packet of data. In addition, during the transmission of a broadcast packet, all the I/F cards, except the one transmitting the broadcast packet, are also in the idle state. Since the switch is constructed to transmit variable length packets, the waiting time until all the I/F cards and input ports are in the idle state, i.e., have completed their current packet transmissions, is also variable and may be very long. An illustration of this problem is provided below.

A diagram illustrating the timing of the transmission of packets through a prior art switch matrix before and after a broadcast packet is scheduled for transmission is shown in FIG. 3. Assume that prior to the point in time represented by reference arrow 40 in FIG. 3, that each input port is in the midst of receiving a data stream comprising variable length packets. Each line represents a different egress output port from the switch matrix. The output ports comprise output ports #1 through output ports #N but only output ports #1 through #5 and #N are shown for clarity sake. The switch matrix creates a traffic stream from input ports to output ports.

Assume also that at the time represented by reference arrow 40, the controller is notified of a broadcast packet ready for transmission on one of the I/F cards. At this point, the controller ceases starting any new packet transmissions and waits until the busy ports finish their transmissions of the current packet. After the last port has completed transmission, the controller configures the switch matrix to transmit the broadcast packet to all the output ports. Once the broadcast packet has completed transmission through the switch, new packets queued up in each of the I/F cards begin transmission through the switch matrix to the output ports and normal unicast packet flow resumes.

With reference to FIG. 3, the waiting time $T_W$ can be relatively large compared to the transmission time of some of the packets. The controller must wait for the longest length packet to finish transmission before sending the broadcast packet. The waiting time $T_W$ in this case extends from the end of the packet output from port #5 to the end of the packet output from port #4. Only at that point can the broadcast packet 42 be transmitted through the switch. The time of transmission of the broadcast packet is denoted by $T_{BC}$. The waiting time $T_W$, i.e., unutilized slot time, before transmitting the broadcast packet causes a large decrease in performance. This problem is even more acute when the switch is capable of operating at very high speeds.

SUMMARY OF THE INVENTION

The present invention is a crossbar switching matrix that improves the transmission of variable length broadcast packets. The type of environment suitable for application of the present invention is any data switching device that is adapted to switch variable length units of data, e.g., packets, frames, cells, etc. The invention provides for greatly reduced latency when transmitting broadcast packets through the switch matrix.

The invention achieves this by halting unicast traffic regardless of the state of packet completion, i.e., in the middle of packet transmission operations, and immediately beginning transmission of the broadcast packet. Once the broadcast packet has finished transmission, unicast packet transmission is resumed without any loss of data.

A unicast buffer is utilized to store the unicast packet while the broadcast packet is being transmitted. A broadcast buffer is used to buffer the broadcast packet as it egresses from the switch matrix. In this fashion, the broadcast information is given high priority and passes quickly through the switch without the large delays associated with the prior art switch matrixes.

The invention is applicable to both electrical and optical switches, wherein in the latter case, the optical signals are converted to electrical signals before arriving at the crossbar matrix and are converted to optical signals after egressing from the crossbar matrix.

There is thus provided in accordance with the invention a crossbar switching system for use with variable length data packets, comprising an N×N crossbar switch matrix comprising N input ports and N output ports, the switch matrix adapted to couple data present at any input to any output port in accordance with switch configuration commands, N interface (I/F) circuits, each I/F circuit coupled to a corresponding input port on the switch matrix, N broadcast/unicast (BC/UNI) buffer circuits, each BC/UNI buffer circuit coupled to a corresponding output port on the switch matrix, the BC/UNI buffer circuit comprising, a unicast buffer adapted to store and forward unicast packets output of the egress of the switch matrix to a corresponding I/F circuit and, a broadcast buffer adapted to store a broadcast packet output of the egress of the switch matrix, a controller adapted to steer unicast packet data to the unicast buffer, the controller operative to halt the transmission of unicast packet data to the unicast buffer in each of N BC/UNI buffer circuits upon the arrival of a broadcast packet, wherein the broadcast packet data output of the switch matrix is stored in the broadcast buffer in each of N BC/UNI buffer circuits and subsequently transmitted to each of the N I/F circuits and wherein the transmission of unicast packet data is resumed following the completion of transmission of the broadcast packet.

The BC/UNI buffer circuit further comprises, a 1 to 2 demultiplexor adapted to steer packet data output of the switch matrix to either the BC buffer or the UNI buffer and, a 2 to 1 multiplexor adapted to transmit the output of either the BC buffer or the UNI buffer in accordance with a select control.

There is also provided in accordance with the invention a broadcast (BC)/unicast (UNI) buffer apparatus for use with an N×N crossbar switch matrix having N input ports and N output ports and adapted to switch variable length data packets, and N interface (I/F) circuits for interfacing physical ports to the switch matrix, the apparatus comprising, broadcast storage means adapted to store broadcast packet data output of the switch matrix, unicast storage means adapted to store unicast packet data output of the switch matrix, steering means operative to either store unicast packet data in the unicast storage means or broadcast packet data in the broadcast storage means, the steering means selecting either the unicast storage means or the broadcast storage means in accordance with a select signal, control means operative to halt the transfer and storage of unicast packet data to the unicast storage means upon the arrival of a broadcast packet, whereby the broadcast packet data is stored in the broadcast storage means and transmitted to the I/F circuit and wherein the transmission and storage of unicast packet data into the unicast storage means is resumed following the completion of transmission of the broadcast packet.

There is further provided in accordance with the invention, in a switching system including an N×N crossbar switch matrix having N input ports and N output ports and adapted to switch variable length data packets, and N interface (I/F) circuits for interfacing physical ports to the switch matrix, a method of reducing the latency of broadcast packet transmission through the switching system, the method comprising the steps of storing unicast packet data in a unicast storage buffer in the absence of a broadcast packet to be transmitted through the switching system, halting the transmission of unicast packet data through the switch matrix and the subsequent storage of unicast packet data in the unicast storage buffer, storing broadcast packet data in a broadcast storage buffer immediately after it arrival to the switch matrix and resuming the transmission through the switch matrix and the subsequent storage in the unicast storage buffer of unicast packet data.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ATM | Asynchronous Transfer Mode |
| BC | Broadcast |

-continued

| Term | Definition |
| --- | --- |
| EOP | End Of Packet |
| FIFO | First In First Out |
| I/F | Interface |
| I/O | Input/Output |
| IP | Internet Protocol |
| MC | Multicast |
| OC | Optical Carrier |
| TCP | Transmission Control Protocol |
| UNI | Unicast |

General Description

The present invention is a crossbar switching matrix that improves the transmission of variable length broadcast packets. The invention provides for greatly increased performance when transmitting broadcast packets through the switch matrix. The invention achieves this by stopping the unicast traffic in the middle of packet transmission operations and inserting the broadcast packet. Once the broadcast packet has finished transmission, unicast packet transmission resumes without any loss of data. A unicast buffer is used to store the unicast packet while the broadcast packet is being transmitted. A broadcast buffer is used to buffer the broadcast packet as it egresses from the switch matrix. In this fashion, the broadcast information is given high priority and passes quickly through the switch without the large delays associated with the prior art switch matrixes.

Note that the crossbar switch matrix of the present invention is applicable to any switching matrix that is adapted to switch variable length data units, e.g., packets, frames, cells, etc. The invention is applicable to both electrical and optical switches, wherein in the latter case, the optical signals are converted to electrical signals before arriving at the crossbar matrix and are converted to optical signals after egressing from the crossbar matrix.

Figure 1:
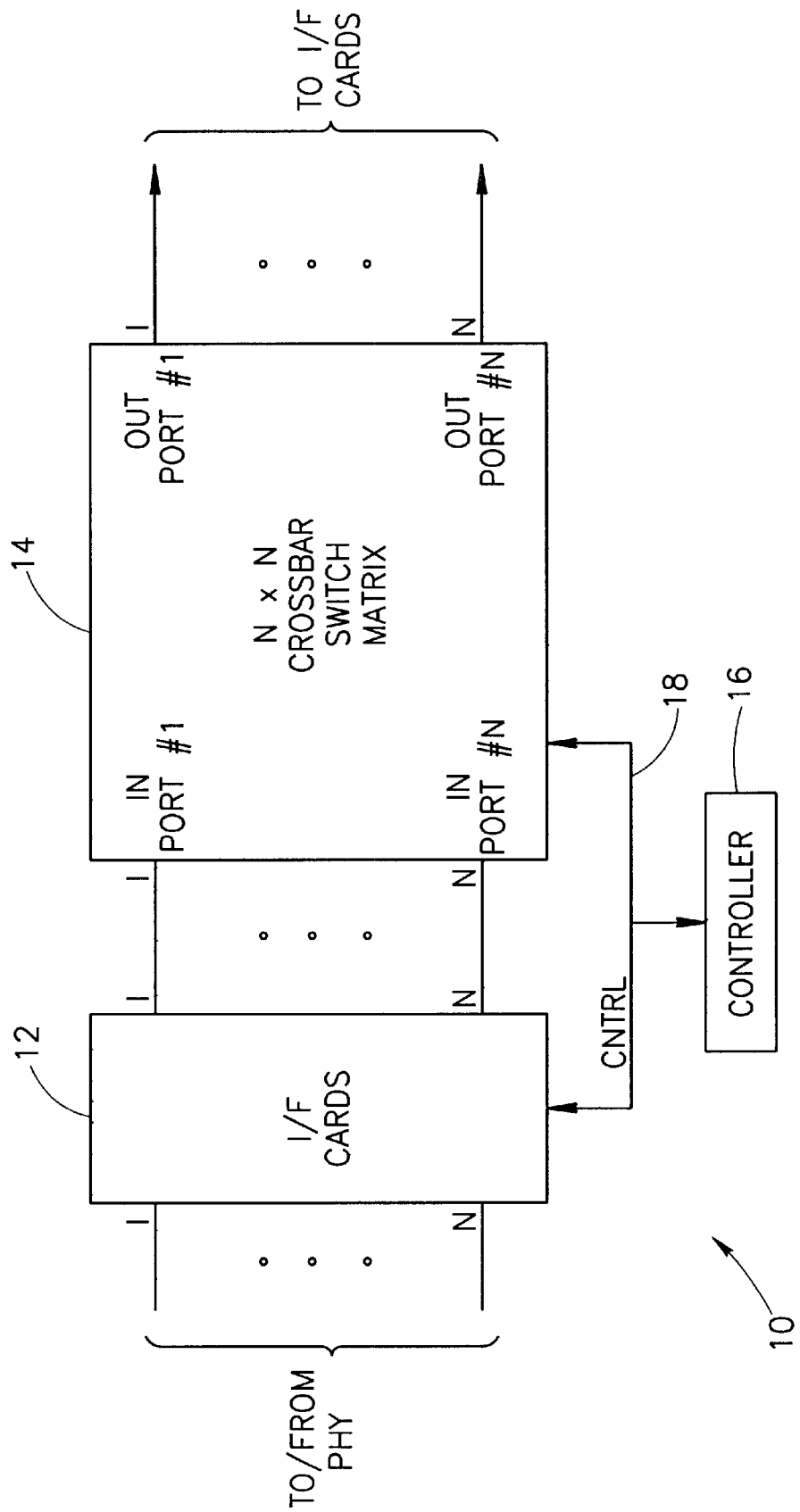
FIG. 1 is a block diagram illustrating an example prior art crossbar switch matrix capable of handling unicast, broadcast and multicast traffic.
Figure 2:
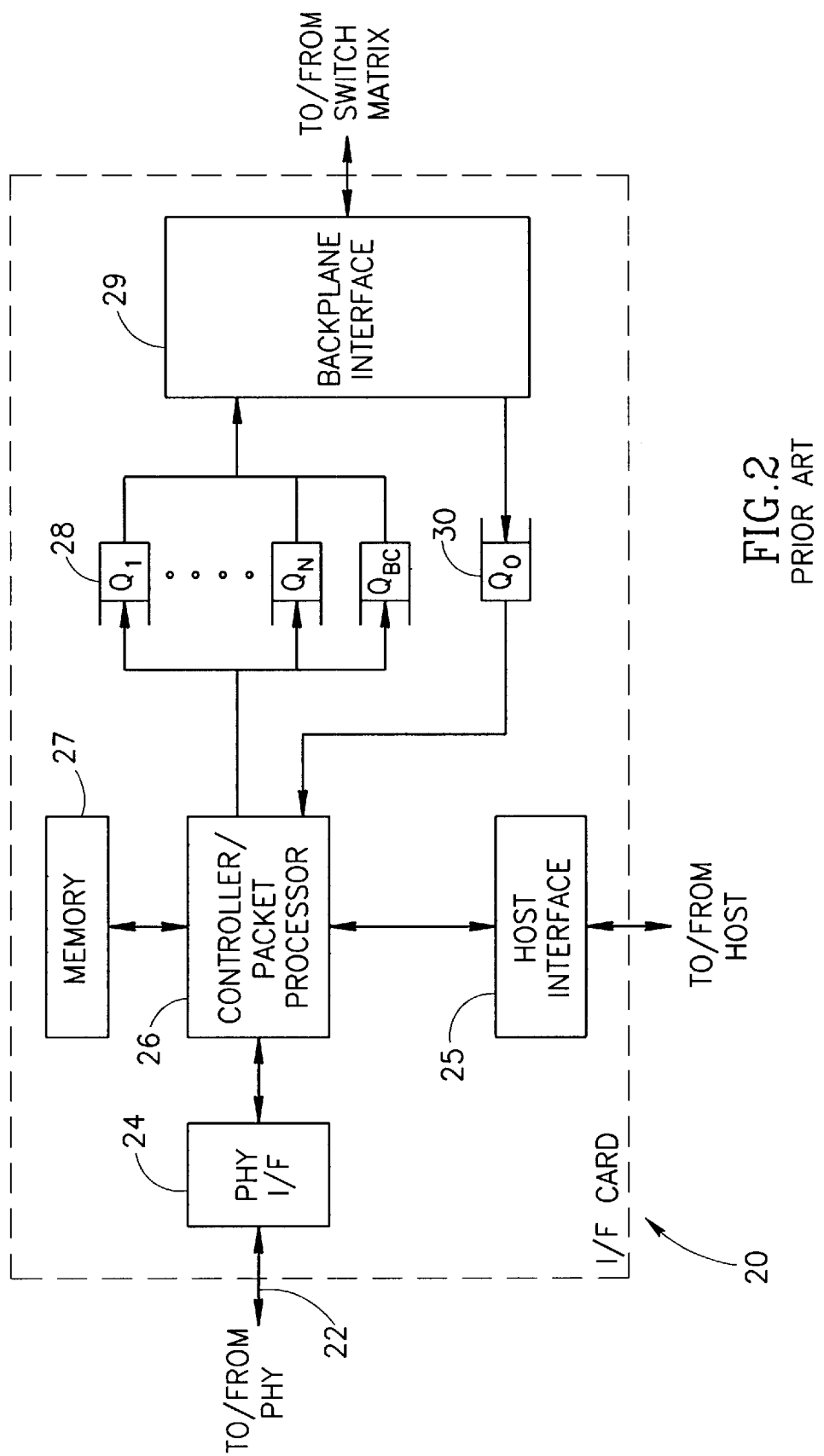
FIG. 2 is a block diagram illustrating the I/O interface card of the prior art switch in more detail.
Figure 4:
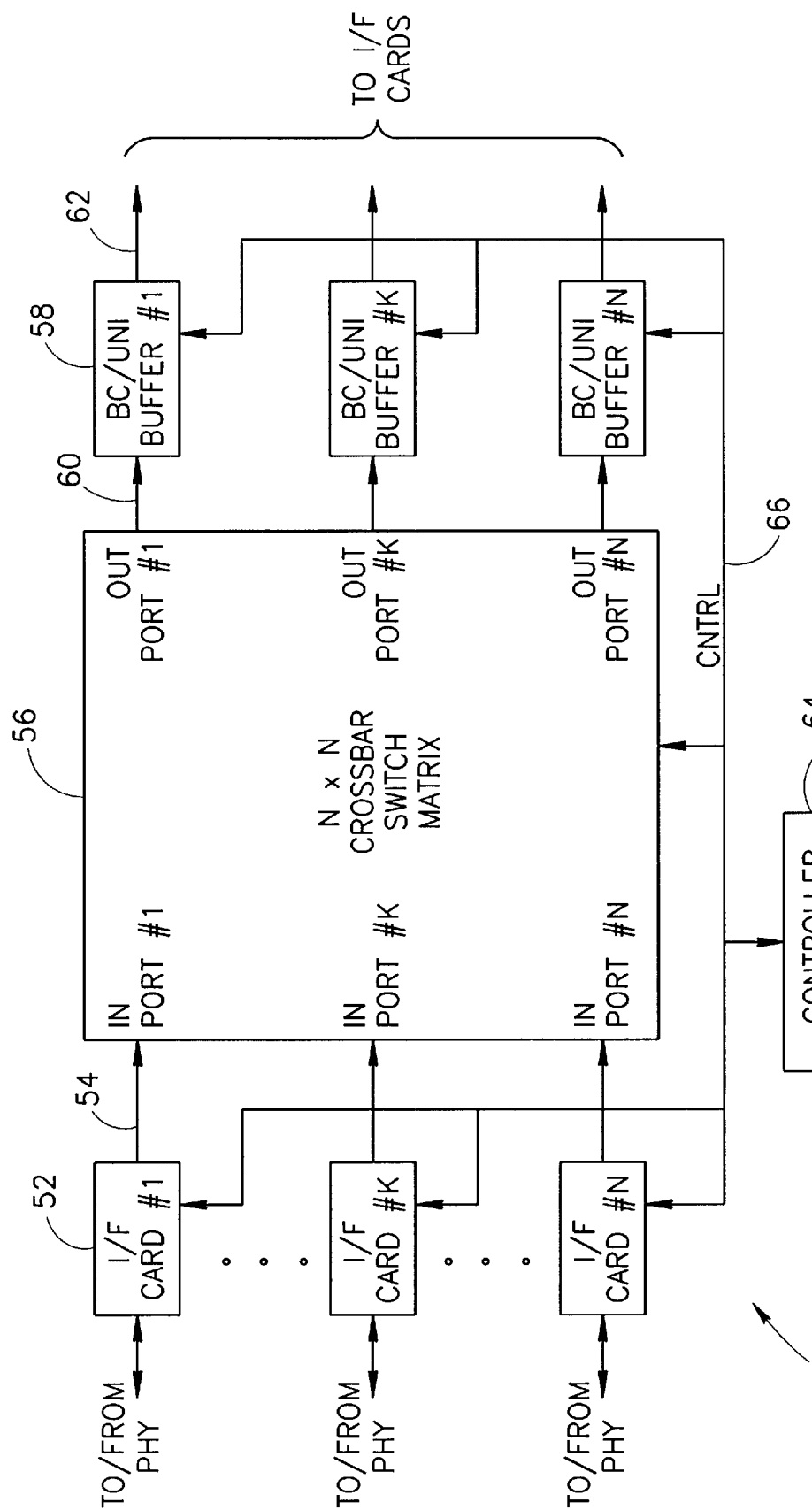
FIG. 4 is a block diagram illustrating a crossbar switch constructed in accordance with an embodiment of the present invention and having improved broadcast performance.

The crossbar switching of the present invention will now be described in more detail. A block diagram illustrating a crossbar switch constructed in accordance with an embodiment of the present invention and having improved broadcast performance is shown in FIG. 4. The crossbar switch system, generally referenced 50, comprises an N×N crossbar switch matrix 56 having N input ports and N output ports. Coupled to the N input ports are N I/F cards 52. Each I/F card is constructed and operates similarly to that of I/F card 20 (FIG. 2). The basic operation of the crossbar switch matrix 56 is similar to that of the switch matrix 14 (FIG. 1) described hereinabove.

The I/F cards function to couple data to and from the physical interface to the switch matrix 56 via signal lines 54. Each I/F card is coupled to one of the input ports on the switch matrix.

Rather than transmit the data at the egress of the switch matrix directly back to the I/F cards, as in prior art devices, the present invention inputs the data to a broadcast/unicast (BC/UNI) buffer 58 instead via signal lines 60. The output signal from each of the buffers 62 is returned to the I/F card for ultimate output from the physical interface.

A controller 64 functions to administer and manage the configuration, switching and provisioning of the switch matrix 56, I/F cards 52 and BC/UNI buffers 58 via a plurality of control signals 66.

Figure 5:
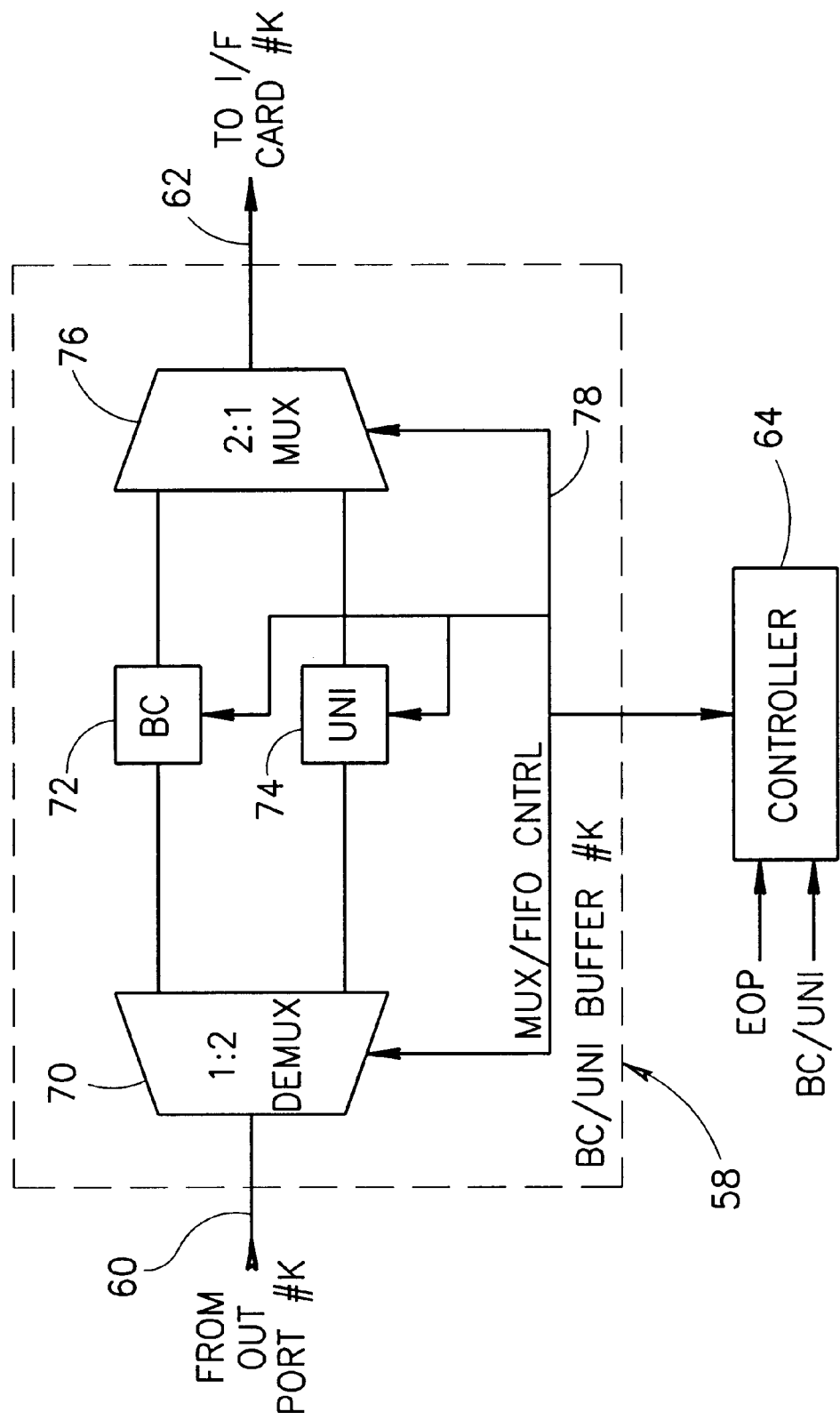
FIG. 5 is a schematic diagram illustrating a first embodiment of the broadcast/unicast buffer of the present invention in more detail.

A schematic diagram illustrating the broadcast/unicast buffer of the present invention in more detail is shown in FIG. 5. The BCIUNI buffer circuitry 58 comprises a 1 to 2 demux 70, broadcast (BC) FIFO or equivalent buffer 72, unicast (UNI) FIFO or equivalent buffer 74 and a 2 to 1 mux 76.

Note that a separate BC/UNI buffer circuit is coupled to each of the output ports #1 through #N on the switch matrix. For illustration purposes, the BC/UNI buffer #K is shown in detail but it is intended to represent each of the BC/UNI buffers 58.

In operation, unicast packets are output of the switch matrix and enter the 1 to 2 demux which is configured to steer the data to the UNI buffer 74. Only when the UNI buffer 74 contains a complete packet, i.e., packet transmission to the UNI buffer is complete, does the packet get clocked out to the I/F card for egress transmission. The output of the UNI buffer 74 is transmitted through the 2 to 1 multiplexor 76.

When a broadcast packet is to be transmitted, unicast packet transmission is substantially immediately suspended regardless of the current state of transmission, i.e., beginning, end, etc. The 1 to 2 demux is selected to steer data from the output port on the switch matrix to the BC buffer 72. Data is immediately clocked out through the 2 to 1 mux to the I/F card. Alternatively, the broadcast packet data may be stored in the BC buffer until a complete packet resides therein before beginning transmission to the I/F card.

The controller 64, via one or more control signals 78 (labeled MUX/FIFO CNTRL), provides the appropriate select signals to the demux 70, mux 76 and the appropriate enable, write and read clock signals to the BC buffer 72 and UNI buffer 74. In accordance with the invention, the controller has knowledge of the end of packet (EOP) and is notified when a broadcast packet is awaiting transmission in a broadcast queue in an I/F card. This is represented by the EOP and BC/UNI signals input to the controller 64. The end of packet is important as the controller uses this information to determine when to start clocking data out of the UNI buffer. The EOP signal is also used to determine when the broadcast packet has completed transmission.

In the event a broadcast packet arrives to the broadcast queue in an I/F card while the data packet is being transmitted from any input port to any output port, transmission of the unicast packet from the egress of the switch to the UNI buffer stops immediately. The front portion of the packet already stored in the unicast buffer remains there while the back portion of the packet remains in the queue in the I/F card associated with the particular output port.

The broadcast packet will be transmitted into and stored in the broadcast buffer of each of the BC/UNI buffer circuits #1 through #N. The controller immediately begins the transmission of the broadcast buffer to the I/F card. Once the transmission of the broadcast packet is complete, unicast packet transmission of the back portion of the packet resumes to the unicast buffer and then to the I/F card upon completion of transmission to the UNI buffer.

Note that the interface between the switch matrix and the BC/UNI buffer and the I/F card may comprise any suitable type of interface, e.g., serial, parallel, multiple serial, optical fiber, etc. In addition, it is not crucial to the invention where the N BC/UNI buffer circuits are located. They may be located with the switch matrix circuitry or they may be located on the individual I/F cards.

Figure 3:
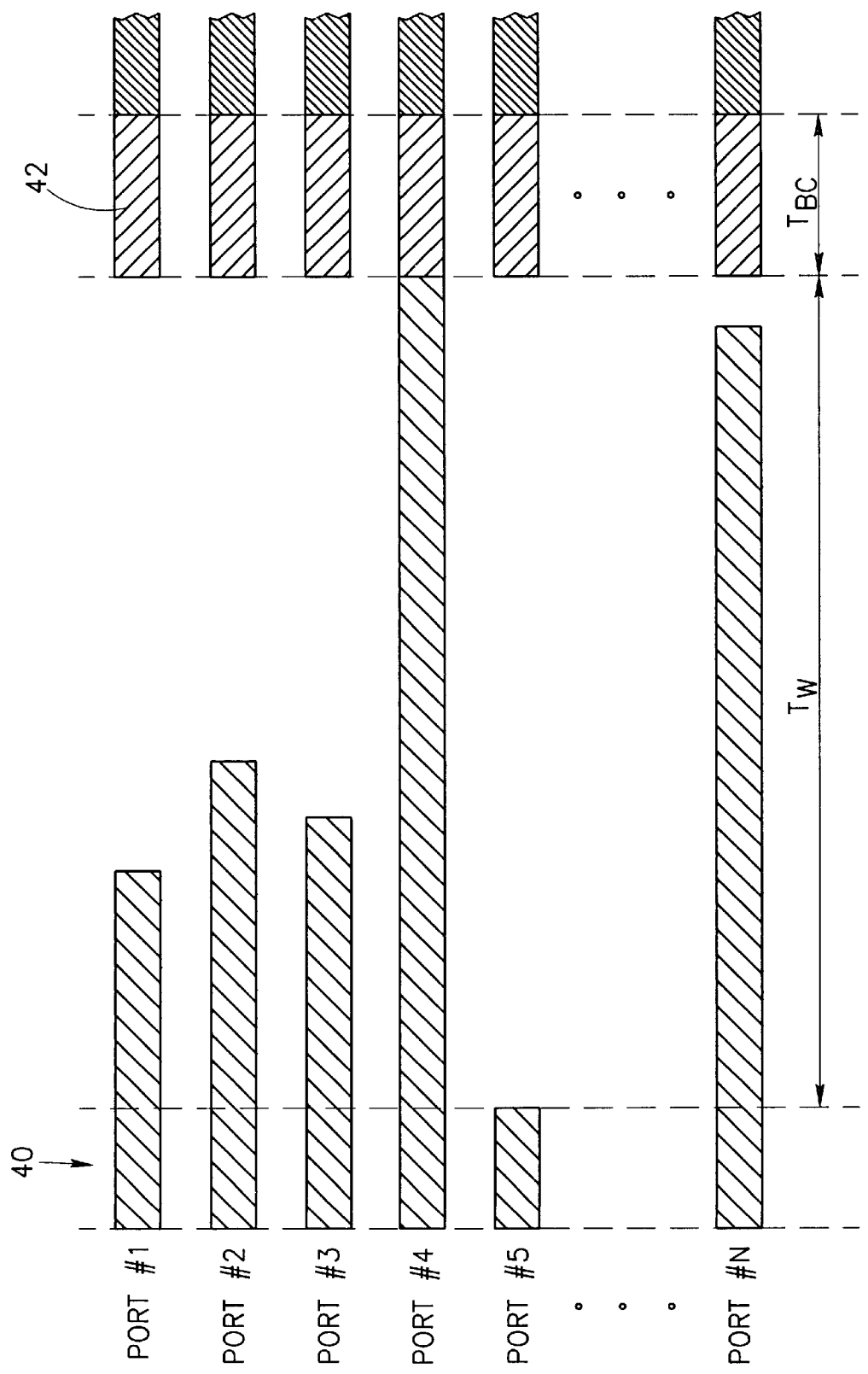
FIG. 3 is a diagram illustrating the timing of the transmission of packets through a prior art switch matrix before and after a broadcast packet is scheduled for transmission.
Figure 6:
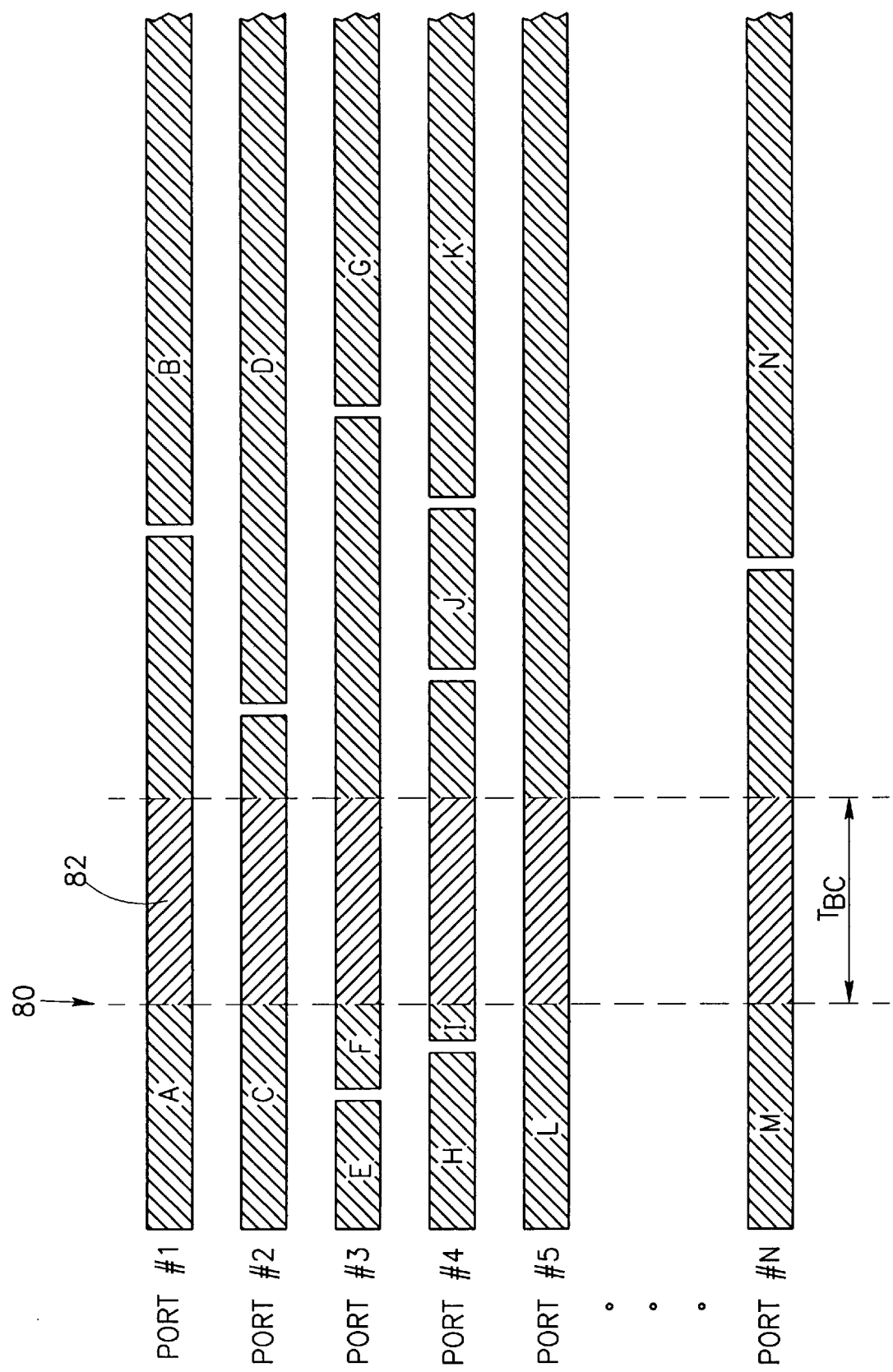
FIG. 6 is a diagram illustrating the timing of the transmission of packets as they exit the switch matrix of the present invention before and after a broadcast packet is scheduled for transmission.

A diagram illustrating the timing of the transmission of packets as they exit the switch matrix of the present invention before and after a broadcast packet is scheduled for transmission is shown in FIG. 6. Shown here is a diagram similar to that of FIG. 3 but using the crossbar switch of the present invention. Variable length unicast packet data is shown for six ports (#1 through #5 and #N). Packets start and stop at times unrelated to other packets. Consider the arrival of a broadcast packet at a point in time represented by reference arrow 80. In accordance with the present invention, unicast packet transmission ceases and the transmission of the broadcast packet 82 begins immediately. The broadcast packet has a time duration of $T_{BC}$. Once transmission is complete, the unicast transmission resumes from the point is left off, without the large idle waiting times of the prior art switch matrix.

Figure 7:
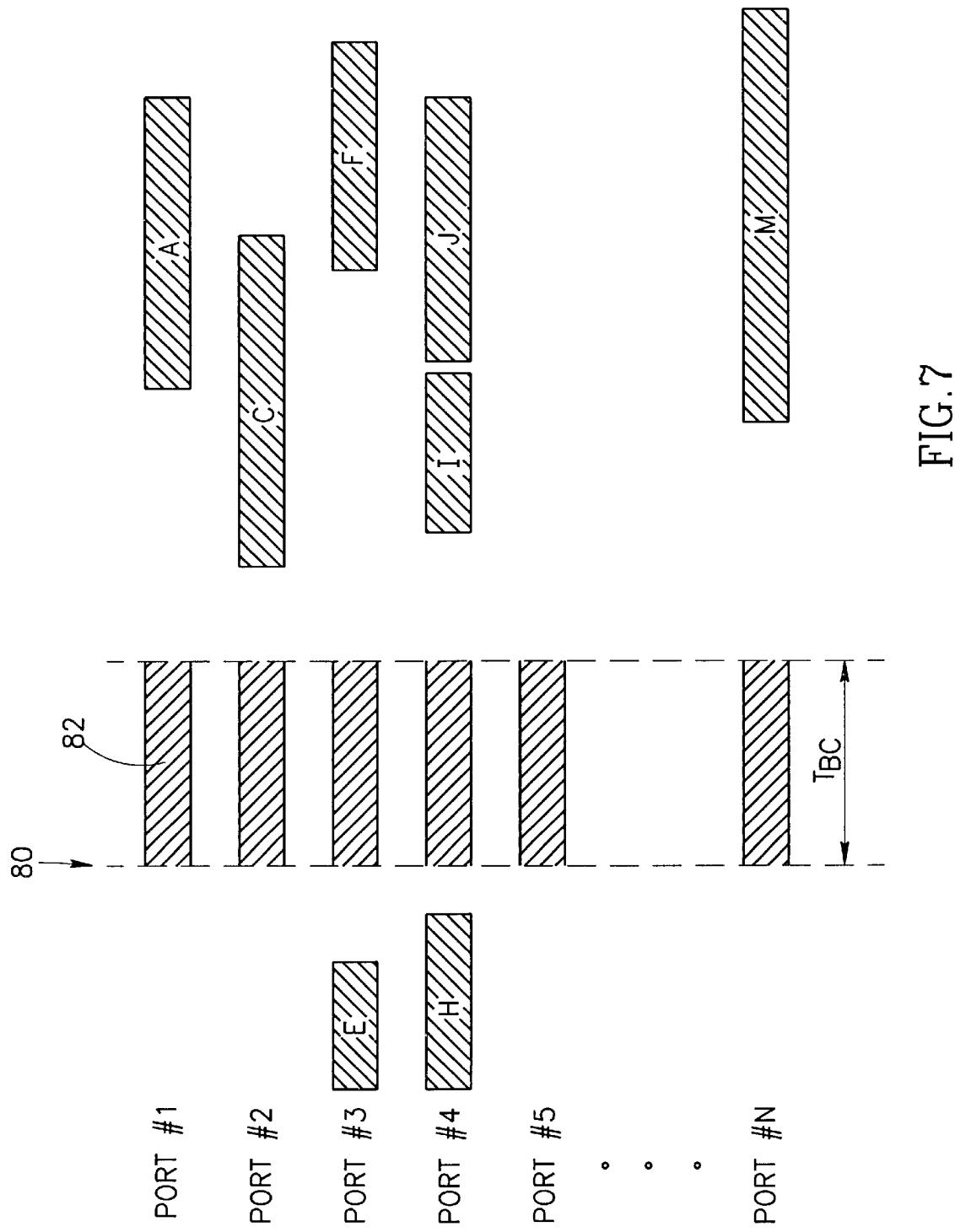
FIG. 7 is a diagram illustrating the timing of the transmission of packets as they exit the BC/UNI buffer of the present invention before and after a broadcast packet is scheduled for transmission.

A diagram illustrating the timing of the transmission of packets as they exit the BC/UNI buffer of the present invention before and after a broadcast packet is scheduled for transmission is shown in FIG. 7. The corresponding letter referenced packets shown exiting the switch matrix in FIG. 6 are shown in FIG. 7 as they exit the BC/UNI buffer and are subsequently input to the I/F cards.

In accordance with the present invention, only the packets that have completed transmission through the switch matrix are forwarded from the UNI buffer to the I/F cards. The gaps in transmission represent the time required to wait for the packet to complete its transfer through the switch. During the time the current packet is transferred from the UNI buffer, the subsequent packet is stored in the UNI buffer. The packets not shown have not completed transmission through the switch matrix and thus, have not begun to be transferred to the I/F cards.

The use of the present invention provides maximum utilization of the bandwidth of the crossbar switching matrix, without compromising or degrading the bandwidth of the overall traffic.

Figure 8:
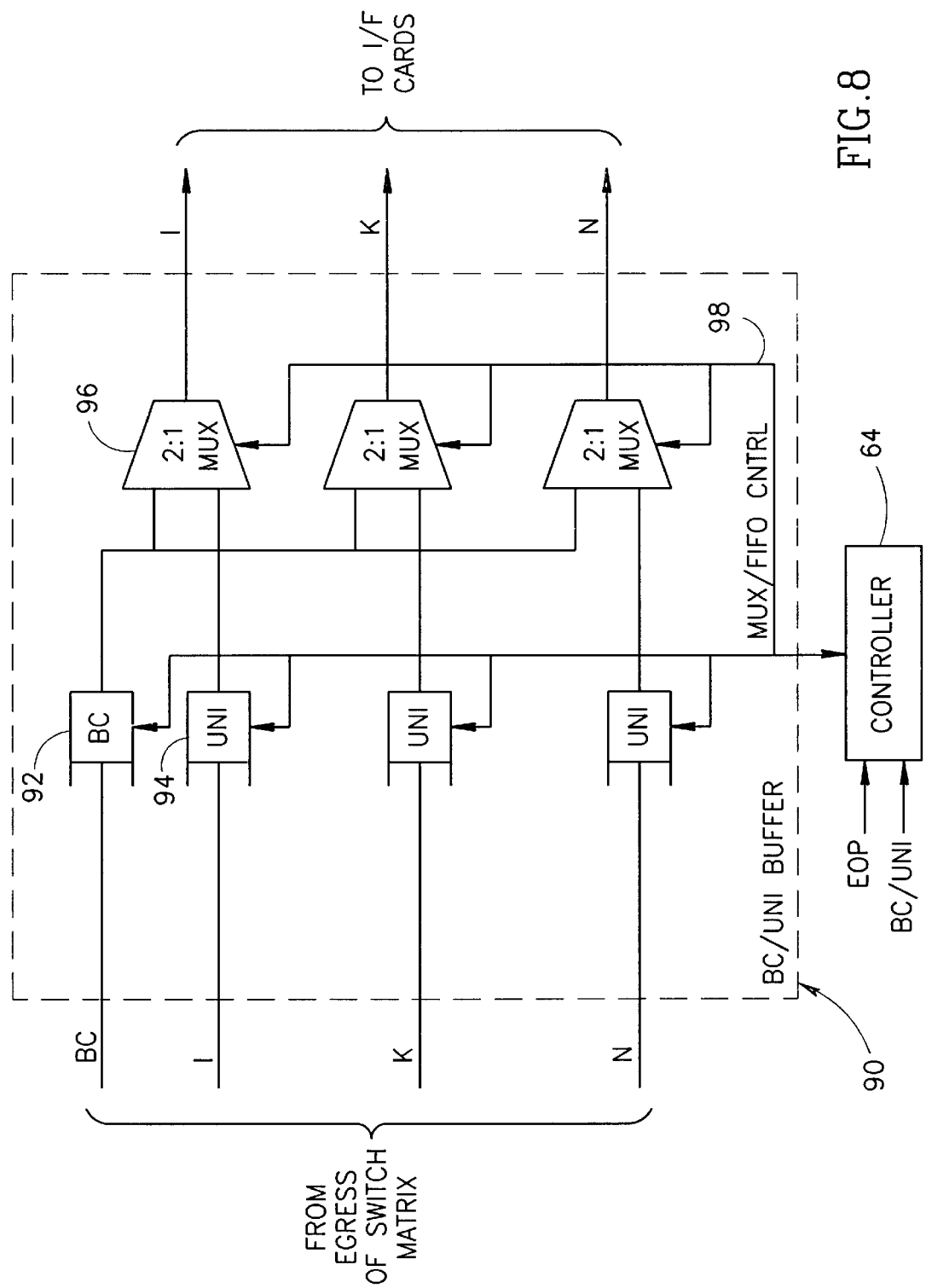
FIG. 8 is a schematic diagram illustrating a second embodiment of the broadcast/unicast buffer of the present invention in more detail.

An alternative embodiment of the BC/UNI buffer circuit is shown in FIG. 8. In an alternative embodiment, the individual BC/UNI buffer circuits 58 are replaced by a single BC/UNI buffer circuit, generally referenced 90, comprising a single BC FIFO or buffer 92, a plurality of UNI FIFOs or buffers 94 and 2 to 1 muxes 96, each pair of UNI buffer and mux corresponding to an output port on the switch matrix. Similar to the circuit 58 of FIG. 5, the controller 64 provides the one or more control signals 98 (labeled MUX/FIFO CNTRL), which include the appropriate enable, write and read clock signals to the BC buffer 92 and UNI buffers 94 in addition to the select signal to the muxes 96.

In this embodiment, the switch matrix is adapted to generate a single consolidated broadcast data signal derived from each of the individual broadcast output queues in each of the I/F cards. The consolidated BC data is input to the BC buffer 92 where it is distributed to each of the 2 to 1 muxes 96 when a broadcast packet is to be transmitted. In unicast operation, the egress data from each of the output ports is input to the corresponding UNI buffer 94 in the BC/UNI buffer circuitry 90. The muxes are selected to output the unicast data until a broadcast packet is to be transmitted at which time the controller selects the BC buffer output. Note that this embodiment it more suited to being collocated with the switch matrix but it is not crucial for operation of the invention.

The present invention is also suitable for use with multicast transmission. In one alternative embodiment, the I/F cards are adapted to place copies of the packet to be multicast into multiple output queues before the switch matrix. In this fashion, the multicast is handled before packets reach the switch matrix. Thus, multicast packets are processed as a plurality of unicast packets. Therefore, queues are only required for unicast packet transmission and broadcast packet transmission.

While the invention has been described with respect to a limited number of embodiments, it will be appreciated that many variations, modifications and other applications of the invention may be made.

What is claimed is:

1. A crossbar switching system for use with variable length data packets, comprising:

an N×N crossbar switch matrix comprising N input ports and N output ports, the switch matrix adapted to couple data present at any input to any output port in accordance with switch configuration commands;

N interface (I/F) circuits, each I/F circuit coupled to a corresponding input port on the switch matrix;

N broadcast/unicast (BC/UNI) buffer circuits, each BC/UNI buffer circuit coupled to a corresponding output port on the switch matrix, the BC/UNI buffer circuit comprising:

a unicast buffer adapted to store and forward unicast packets output of the egress of the switch matrix to a corresponding I/F circuit; and a broadcast buffer adapted to store a broadcast packet output of the egress of the switch matrix;

a controller adapted to steer unicast packet data to the unicast buffer, the controller operative to halt the transmission of unicast packet data to the unicast buffer in each of N BC/UNI buffer circuits upon the arrival of a broadcast packet, wherein the broadcast packet data output of the switch matrix is stored in the broadcast buffer in each of N BC/UNI buffer circuits and subsequently transmitted to each of the N I/F circuits, and wherein the transmission of unicast packet data is resumed following the completion of transmission of the broadcast packet.

2. The system according to claim 1, wherein the BC/UNI buffer circuit further comprises:

a 1 to 2 demultiplexor adapted to steer packet data output of the switch matrix to either the BC buffer or the UNI buffer; and a 2 to 1 multiplexor adapted to transmit the output of either the BC buffer or the UNI buffer in accordance with a select control.

3. A broadcast (BC)/unicast (UNI) buffer apparatus for use with an N×N crossbar switch matrix having N input ports and N output ports and adapted to switch variable length data packets, and N interface (I/F) circuits for interfacing physical ports to the switch matrix, the apparatus comprising:

broadcast storage means adapted to store broadcast packet data output of the switch matrix;

unicast storage means adapted to store unicast packet data output of the switch matrix;

steering means operative to either store unicast packet data in the unicast storage means or broadcast packet data in the broadcast storage means, the steering means selecting either the unicast storage means or the broadcast storage means in accordance with a select signal;

control means operative to halt the transfer and storage of unicast packet data to the unicast storage means upon the arrival of a broadcast packet, whereby the broadcast packet data is stored in the broadcast storage means and transmitted to the I/F circuit, and wherein the transmission and storage of unicast packet data into the unicast storage means is resumed following the completion of transmission of the broadcast packet.

4. In a switching system including an N×N crossbar switch matrix having N input ports and N output ports and adapted to switch variable length data packets, and N interface (I/F) circuits for interfacing physical ports to the switch matrix, a method of reducing the latency of broadcast packet transmission through the switching system, the method comprising the steps of:

storing unicast packet data in a unicast storage buffer in the absence of a broadcast packet to be transmitted through the switching system;

halting the transmission of unicast packet data through the switch matrix and the subsequent storage of unicast packet data in the unicast storage buffer;

storing broadcast packet data in a broadcast storage buffer immediately after it arrival to the switch matrix; and resuming the transmission through the switch matrix and the subsequent storage in the unicast storage buffer of unicast packet data.

* * * * *